US012680369B2

(12) United States Patent
Hori et al.

(10) Patent No.: US 12,680,369 B2
(45) Date of Patent: Jul. 14, 2026

(54) DOOR OPENING AND CLOSING CONTROLLER

(71) Applicant: ISUZU MOTORS LIMITED, Tokyo (JP)

(72) Inventors: Kenji Hori, Fujisawa (JP); Yuji Houzumi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 24 days.

(21) Appl. No.: 18/727,258

(22) PCT Filed: Nov. 7, 2022

(86) PCT No.: PCT/JP2022/041300
§ 371 (c)(1),
(2) Date: Jul. 8, 2024

(87) PCT Pub. No.: WO2023/135908
PCT Pub. Date: Jul. 20, 2023

(65) Prior Publication Data

US 2025/0084691 A1 Mar. 13, 2025

(30) Foreign Application Priority Data

Jan. 17, 2022 (JP) ................................ 2022-004921

(51) Int. Cl.
*E05F 15/73* (2015.01)
*E05F 15/79* (2015.01)

(52) U.S. Cl.
CPC .............. *E05F 15/73* (2015.01); *E05F 15/79* (2015.01); *E05Y 2900/506* (2013.01)

(58) Field of Classification Search
CPC .... E05F 15/73; E05F 15/79; E05Y 2900/506; G16Y 10/40; G16Y 40/30
See application file for complete search history.

(56) References Cited

U.S. PATENT DOCUMENTS

2020/0043344 A1 2/2020 Shimizu
2020/0074159 A1* 3/2020 Ohnishi ................ G06V 20/20
2025/0142199 A1* 5/2025 Ong .................... H04N 23/611

FOREIGN PATENT DOCUMENTS

CA 3052257 A1 * 8/2018 ............. E05F 15/73
CN 106559647 A * 4/2017

(Continued)

OTHER PUBLICATIONS

CN 106559647 A (Year: 2017).*
International Search Report from International Application No. PCT/JP2022/041300 mailed Jan. 10, 2023.

*Primary Examiner* — Roy Rhee

(74) *Attorney, Agent, or Firm* — Shih IP Law Group, PLLC

(57) ABSTRACT

A controller includes: a time difference acquisition part that acquires a time difference from the current time to a scheduled departure time at which a shared vehicle, which performs automatic traveling on the basis of a predetermined operation plan, departs from a shared vehicle stop, when the shared vehicle is stopped at the shared vehicle stop; a region adjusting part that adjusts a detection region for detecting people around the shared vehicle with a sensor mounted on the shared vehicle depending on the time difference; a people flow determination part that determines a people flow in the adjusted detection region; and an opening and closing control part that controls a closing operation of closing an entry/exit door of the shared vehicle on the basis of the people flow that has been determined.

7 Claims, 8 Drawing Sheets

(56) References Cited

FOREIGN PATENT DOCUMENTS

| | | | |
|---|---|---|---|
| JP | 2020-038608 | A | 3/2020 |
| JP | 2020-064570 | A | 4/2020 |
| JP | 2021-018578 | A | 2/2021 |
| JP | 2021-174405 | A | 11/2021 |
| WO | 2018037954 | A1 | 3/2018 |

* cited by examiner

DOOR OPENING AND CLOSING CONTROLLER

The present application is a U.S. National Stage entry of PCT Application number PCT/JP2022/041300, filed on Nov. 7, 2022, which claims priority under 35 U.S.C § 119(a) to Japanese Patent Application No. 2022-004921, filed on Jan. 17 2022, contents of which are incorporated herein by reference in their entirety.

TECHNICAL FIELD

The present invention relates to a door opening and closing controller that opens and closes an entry/exit door of shared vehicles.

BACKGROUND OF THE INVENTION

In recent years, in autonomous buses being considered for practical use, opening and closing of an entry/exit door are automatically performed when a bus stops at bus stops. To enable the smooth departure of autonomous buses from the bus stops, a technique has been proposed in which an entry/exit door is closed by predicting the behavior of surrounding people using cameras or the like placed at the bus stops (see Patent Document 1 described below), for example.

PRIOR ART

Patent Document

[Patent Document 1]: Japanese Unexamined Patent Application Publication No. 2020-64570

BRIEF DESCRIPTION OF THE INVENTION

Problem to be Solved by the Invention

However, since it is necessary to place monitoring devices such as cameras at bus stops and to establish a network system to communicate between the monitoring devices and a management device in the technique of Patent Document 1, there has been a demand for realizing it with a simple method.

The present invention focuses on this point, and its object is to perform automatic opening and closing of an entry/exit door more appropriately, without using a complicated system.

Means for Solving the Problem

One aspect of the invention provides A door opening and closing controller including: a time difference acquisition part that acquires a time difference from a current time to a scheduled departure time at which a shared vehicle, which performs automatic traveling on the basis of a predetermined operation plan, departs from a shared vehicle stop, when the shared vehicle is stopped at the shared vehicle stop; a region adjusting part that adjust a detection region for detecting people around the shared vehicle with a sensor mounted on the shared vehicle depending on the time difference; a people flow determination part that determines a people flow in the adjusted detection region; and an opening and closing control part that controls a closing operation of closing an entry/exit door of the shared vehicle on the basis of the people flow that has been determined.

The smaller the time difference, the more the region adjusting part may narrow the detection region.

The region adjusting part may adjust detection regions of a plurality of the sensors, each detecting different directions, according to the time difference.

The people flow determination part may identify a movement vector of a person around the shared vehicle, and the opening and closing control part may close the entry/exit door when at least a part of the movement vector is not located within the detection region.

The opening and closing control part may close the entry/exit door even if at least a part of the movement vector is located within the detection region, if an angle formed by a side surface of the shared vehicle where the entry/exit door is provided and the movement vector deviates is outside a predetermined angle range centered around the entry/exit door.

The people flow determination part may exclude a person who passes by the entry/exit door along a front-rear direction of the shared vehicle from the determination for controlling the closing operation.

The opening and closing control part may close the entry/exit door at a timing when it is determined, by the people flow determination part, that no people flow reaches the entry/exit door by the scheduled departure time.

Effect of the Invention

According to the present invention, it is possible to perform automatic opening and closing of an entry/exit door more appropriately, without using a complicated system.

DESCRIPTION OF EMBODIMENTS

<Configuration of a Door Opening and Closing Controller>

Figure 1:
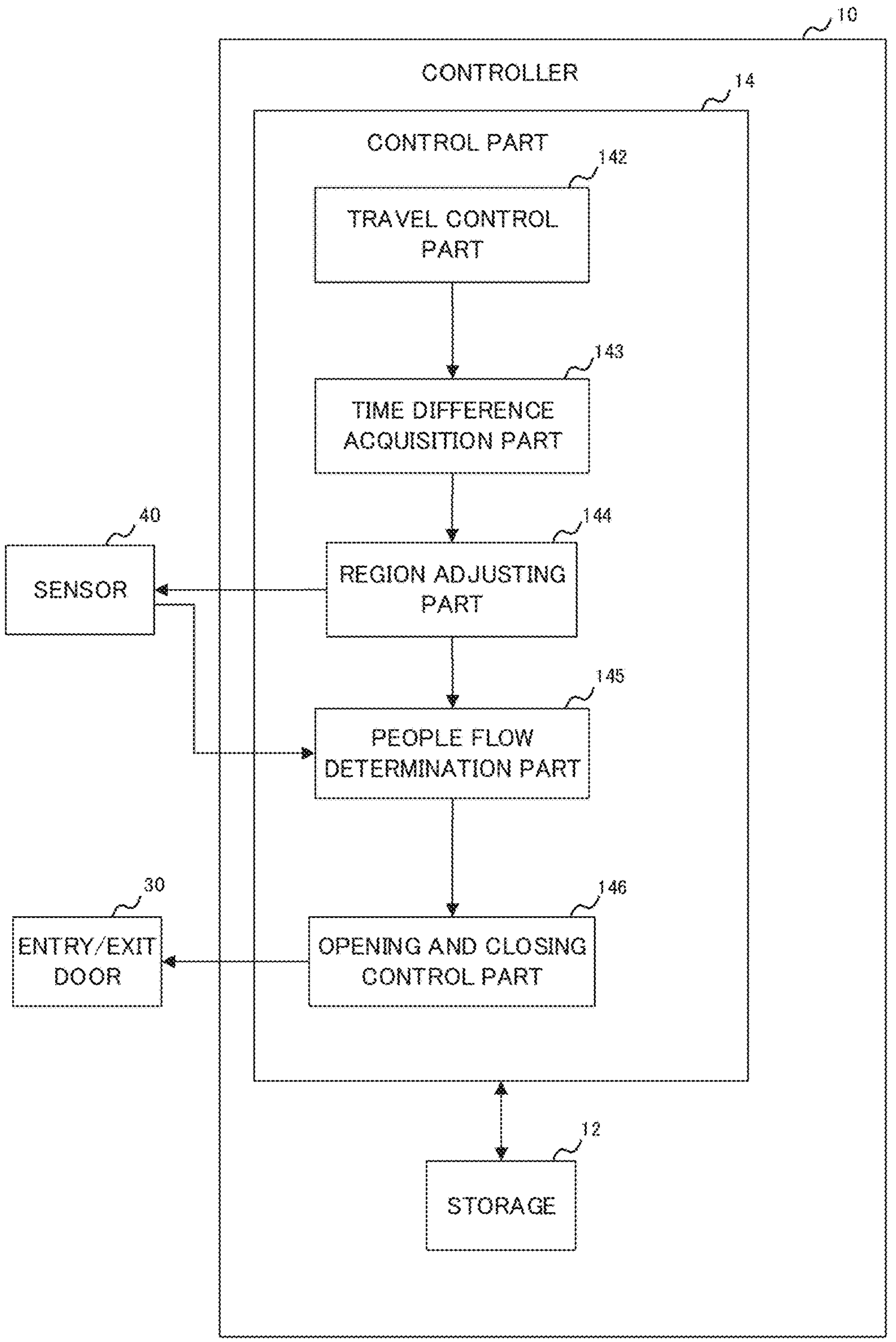
FIG. 1 is a diagram illustrating a configuration of a controller 10.
Figure 2:
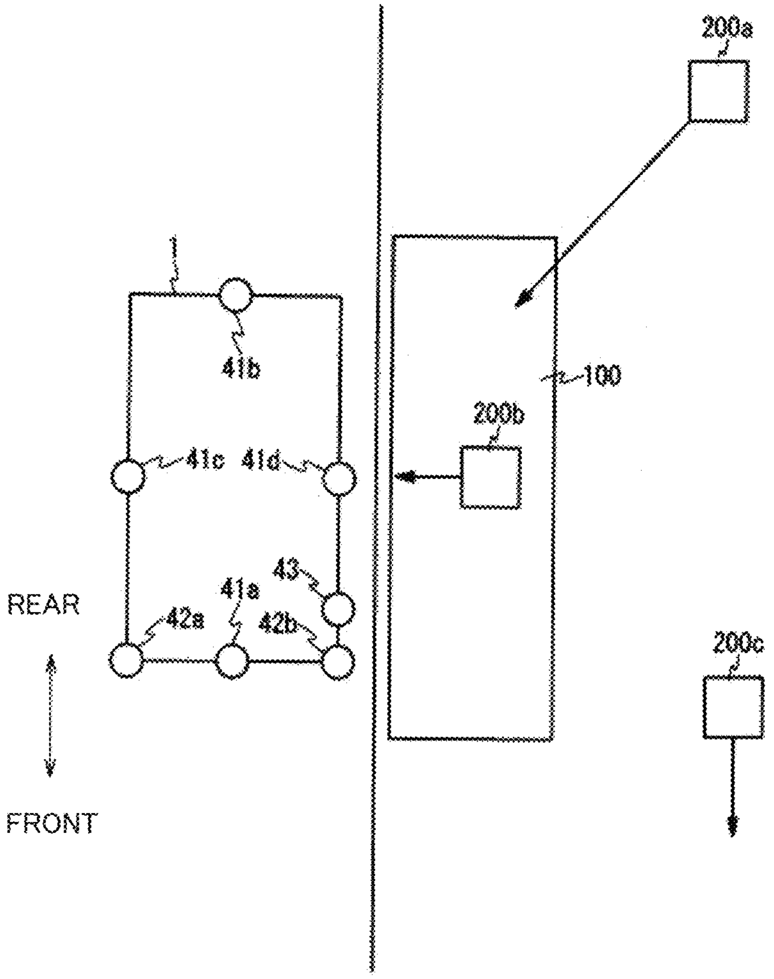
FIG. 2 is a schematic diagram for illustrating an autonomous bus 1.

FIG. 1 is a diagram illustrating a configuration of a controller 10. FIG. 2 is a schematic diagram for illustrating an autonomous bus 1. FIG. 2 shows a state in which the autonomous bus 1 is stopped at a bus stop.

The controller 10 is mounted on the autonomous bus 1, and controls operations of the autonomous bus 1. In addition, the controller 10 has a function as a door opening and closing controller that controls opening and closing of an entry/exit door 30 of the autonomous bus 1. The entry/exit door 30 is opened and closed when the autonomous bus 1 stops at a bus stop.

The autonomous bus 1 is a shared vehicle that performs automatic traveling on the basis of a predetermined operation plan. The autonomous bus 1 is a bus that moves along a predetermined operation route, for example, and scheduled dwell times and departure times of each bus stop of the operation route are determined in the operation plan.

The autonomous bus 1 includes the entry/exit door 30 that is provided on a side surface of a vehicle body and can be opened and closed. Further, the autonomous bus 1 includes a sensor 40 capable of detecting surrounding objects. The sensor 40 includes a camera, a radar, and a LiDAR, for example. By capturing images of the surroundings of the autonomous bus 1, the camera detects a person and the like. The radar and the LiDAR use light to detect surrounding people and the like.

The sensor 40 can detect surrounding people when the autonomous bus 1 is stopped at a bus stop. The sensor 40 detects people located within a predetermined detection region. When the autonomous bus 1 is stopped at the bus stop 100, the controller 10 controls a closing operation of closing the entry/exit door 30 on the basis of a detection result in the detection region of the sensor 40.

As illustrated in FIG. 2, LiDARs 41*a*, 41*b*, 41*c* and 41*d*, radars 42*a* and 42*b*, and a camera 43 are provided as the sensors 40 in the autonomous bus 1. The LiDARs 41*a*, 41*b*, 41*c* and 41*d*, the radars 42*a* and 42*b*, and the camera 43 are each attached to the autonomous bus 1 to face predetermined directions, and their detection regions differ from each other. This makes it easier to appropriately perform detection in all directions from the autonomous bus 1. All of the three types of sensors described above do not need to be used, and two types of sensors may be used.

In order to more appropriately perform the closing operation of the entry/exit door 30 according to a people flow around the autonomous bus 1, the controller 10 of the present embodiment adjusts the detection region of the sensor 40 depending on a time difference from the current time to a scheduled departure time, and controls the closing operation of the entry/exit door 30 on the basis of the determination result of the people flow in the detection region after the adjustment.

As illustrated in FIG. 1, the controller 10 includes a storage 12 and a control part 14. The storage 12 includes a read only memory (ROM) and a random access memory (RAM), for example. The storage 12 stores programs to be executed by the control part 14 and various types of data. In addition, the storage 12 stores the operation plan of the autonomous bus 1. For example, the storage 12 stores a route along which the autonomous bus 1 travels, and scheduled dwell times and scheduled departure times at bus stops on the route.

The control part 14 is a CPU (Central Processing Unit) and controls opening and closing of the entry/exit door 30 of the autonomous bus 1, for example. The control part 14 functions as a travel control part 142, a time difference acquisition part 143, a region adjusting part 144, a people flow determination part 145, and an opening and closing control part 146 by executing the programs stored in the storage 12.

The travel control part 142 controls traveling of the autonomous bus 1. The travel control part 142 causes the autonomous bus 1 to travel according to the operation plan stored in the storage 12. For example, the travel control part 142 performs control to stop at each bus stop (for example, the bus stop 100) on the operation route at a predetermined scheduled dwell time and to depart from it at a predetermined scheduled departure time.

When the autonomous bus 1 is stopped at the bus stop 100, the time difference acquisition part 143 acquires a time difference from the current time to a scheduled departure time at which the autonomous bus 1 departs from the bus stop 100. Specifically, the time difference acquisition part 143 acquires the time difference by referencing the scheduled departure times of the bus stop included in the operation plan stored in the storage 12. The time difference acquisition part 143 sequentially acquires time differences at predetermined intervals while the autonomous bus 1 is stopped at the bus stop. The time difference acquisition part 143 may detect whether the autonomous bus 1 is stopped at the bus stop 100 with the sensor 40, for example, or may determine this based on the autonomous bus 1 stopping at the scheduled dwell time as a trigger.

The region adjusting part 144 adjusts the detection region to be detected by the sensor 40. In the present embodiment, the detection region of the sensor 40 is not constant but changes while the autonomous bus 1 is stopped at the bus stop 100. Specifically, the region adjusting part 144 adjusts the detection region of the sensor 40 according to the time differences sequentially acquired by the time difference acquisition part 143.

Figure 3:
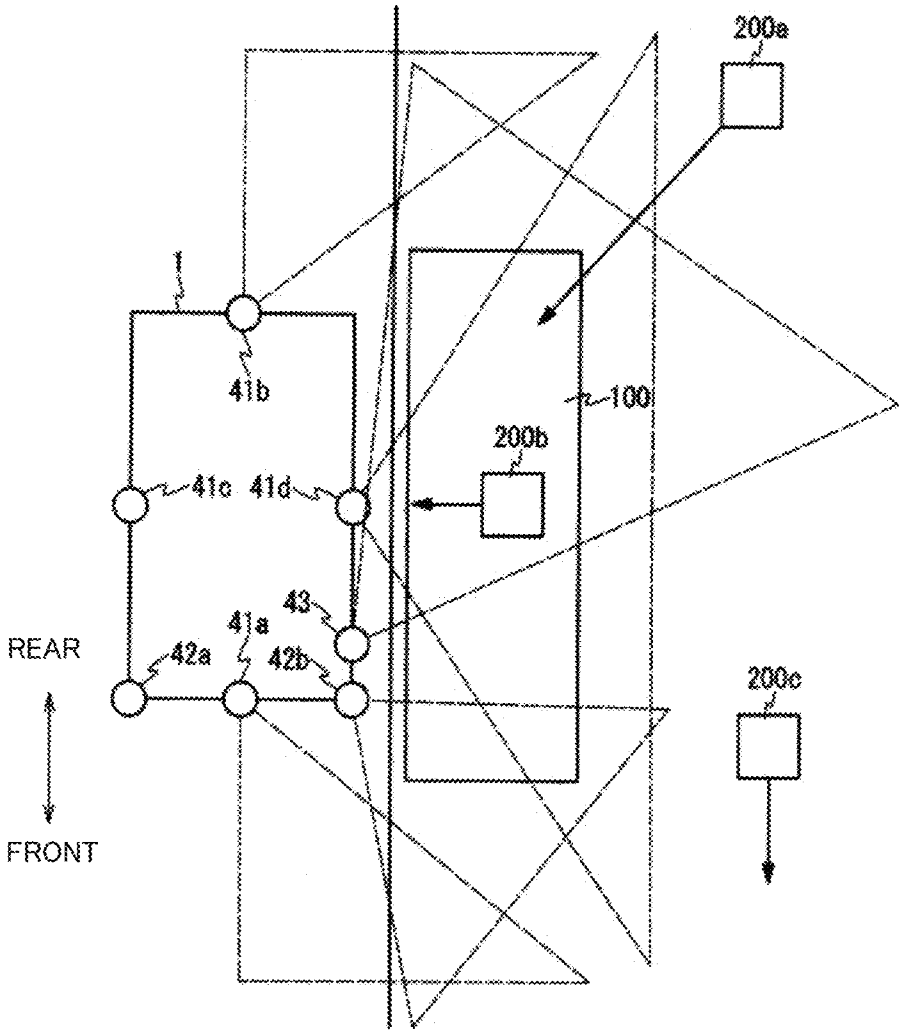
FIG. 3 is a schematic diagram for illustrating detection regions to be adjusted.

FIG. 3 is a schematic diagram for illustrating detection regions to be adjusted. Here, in order to detect a person located around the bus stop 100, detection regions on the bus stop 100 side as viewed from the autonomous bus 1 are the regions to be adjusted (regions surrounded by dashed lines). Specifically, the detection regions of the LiDARs 41*a*, 41*b*, and 41*d*, the radar 42*b*, and the camera 43 are the regions to be adjusted.

Figure 4A:
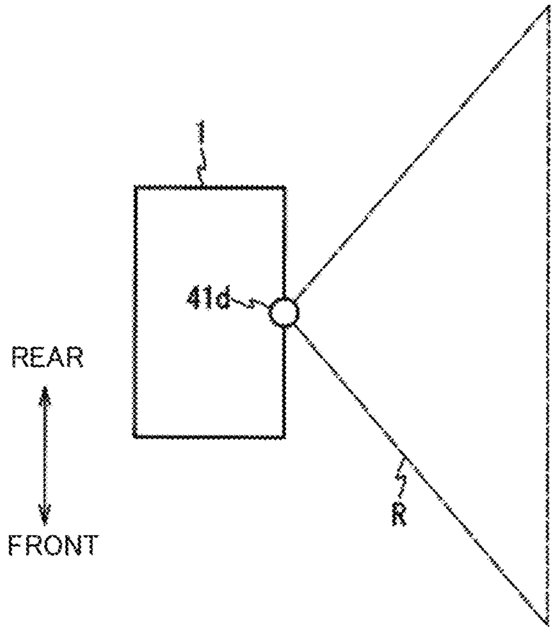
FIG. 4A is a schematic diagram for illustrating an adjustment example of the detection region.
Figure 4B:
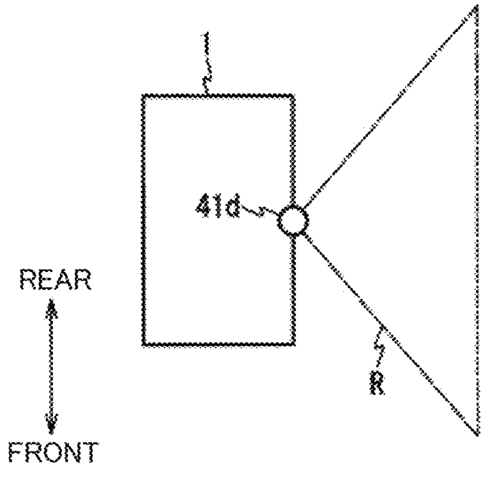
FIG. 4B is a schematic diagram for illustrating an adjustment example of the detection region.

FIGS. 4A and 4B are schematic diagrams for illustrating an adjustment example of the detection region. Here, for convenience of description, only the LiDAR 41*d* is shown, and the other sensors are omitted. FIG. 4A illustrates a detection region R of the LiDAR 41*d* when the time difference from the current time to the scheduled departure time is t1, and FIG. 4B illustrates the detection region R of the LiDAR 41*d* when the time difference is t2, which is shorter than t1. As can be seen from a comparison between FIG. 4A and FIG. 4B, the detection region R in the case of the time difference t2 is narrower than the detection region R in the case of the time difference t1.

The smaller the time difference, the more the region adjusting part 144 narrows the detection region of the sensor 40. In other words, the region adjusting part 144 narrows the detection region as the scheduled departure time of the autonomous bus 1 approaches. By narrowing the detection region in this manner, a person who is likely to reach the entry/exit door 30 by the scheduled departure time of the autonomous bus 1 is detected, and a person who is not likely to reach the entry/exit door 30 by the scheduled departure time is not detected.

FIGS. 4A and 4B each show the adjustment example of the detection region of the LiDAR 41*d*, but the detection regions of other sensors (radars and camera shown in FIG. 3) also change in the same manner. That is, the region adjusting part 144 adjusts the detection regions of a plurality of sensors 40, each detecting different directions, according to the time difference. In this manner, it is possible to appropriately detect a person who is likely to reach the entry/exit door 30 by the scheduled departure time from among people around the autonomous bus 1.

The people flow determination part 145 determines a people flow, which is a flow of people around the autonomous bus 1, on the basis of detection results of the sensors 40. Here, the people flow is a concept including a moving direction and a moving speed of people. In the present embodiment, the people flow determination part 145 determines the people flow in the detection region. Specifically, the people flow determination part 145 determines the people flow in the detection region that has been adjusted according to the time difference until the scheduled departure time.

The people flow determination part 145 identifies a movement vector of people. The movement vector of people reflects the movement direction and movement speed of people. That is, a direction of the vector indicates the moving direction of people, and a length of the vector indicates the moving speed.

Figure 5:
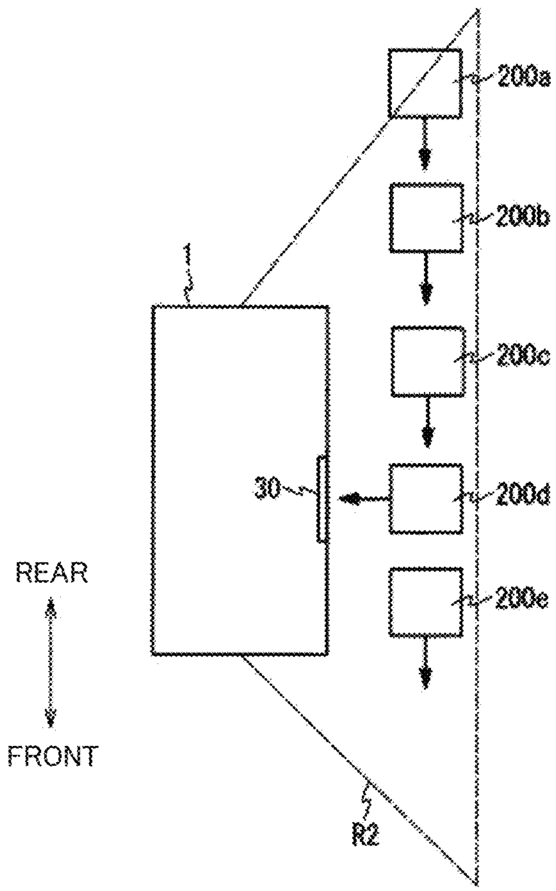
FIG. 5 is a schematic diagram for illustrating an example of a people flow determination.

FIG. 5 is a schematic diagram for illustrating an example of a people flow determination. A detection region R2 illustrated in FIG. 5 is a region obtained by combining the detection region of the LiDAR 41*d* with the detection regions of other sensors. Here, it is assumed that persons 200*a*, 200*b*, 200*c*, 200*d*, and 200*e* are located within the detection region R2. The persons 200*a*, 200*b*, 200*c*, and 200*d* are heading toward the entry/exit door 30 while the person 200*e* has passed by the entry/exit door 30. In this case, the people flow determination part 145 excludes a person who passes by the entry/exit door 30 along the front-rear direction of the autonomous bus 1 from the determination for controlling the closing operation. In this manner, it is possible to prevent an erroneous determination of a person who will not get on the bus for a person who is likely to get on the bus.

The opening and closing control part 146 controls opening and closing of the entry/exit door 30 when the autonomous bus 1 is stopped at the bus stop 100. For example, the opening and closing control part 146 opens the entry/exit door 30 at the scheduled dwell time included in the operation plan stored in the storage 12, and closes the entry/exit door 30 at the scheduled departure time.

In the present embodiment, the opening and closing control part 146 controls the closing operation of closing the entry/exit door 30 on the basis of the people flow that has been determined by the people flow determination part 145. That is, the opening and closing control part 146 controls the closing operation of the entry/exit door 30 on the basis of whether there is or is not a people flow toward the entry/exit door 30. The opening and closing control part 146 closes the entry/exit door 30 when there is no people flow reaching the entry/exit door 30 by the scheduled departure time. In this case, the opening and closing control part 146 may close the entry/exit door 30 at a timing when it is determined that there is no people flow reaching the entry/exit door 30, or may close the entry/exit door 30 at a timing when the scheduled departure time is reached. On the other hand, when there is a people flow reaching the entry/exit door 30 by the scheduled departure time, the opening and closing control part 146 closes the entry/exit door 30 once all people have boarded.

The opening and closing control part 146 controls the closing operation of the entry/exit door 30 based on a position of the movement vector identified by the people flow determination part 145 in the detection region. For example, in a case where at least a part of the movement vector is not located within the detection region, the opening and closing control part 146 closes the entry/exit door 30. In a case where the movement vector is not located within the detection region, it can be estimated that the person will not have reached the entry/exit door 30 at the scheduled departure time, whereas in a case where the movement vector is located within the detection region, it can be estimated that the person will reach the entry/exit door 30 by the scheduled departure time. Therefore, the closing operation of the entry/exit door 30 can be appropriately performed by examining a relationship between the movement vector and the detection region.

The opening and closing control part 146 may control the closing operation of the entry/exit door 30 according to the direction of the movement vector. This is because, even if a person is in the detection region, if his/her moving direction is not toward the entry/exit door 30, it can be estimated that he/she will not board the autonomous bus 1. Specifically, even if at least a part of the movement vector is located within the detection region, the opening and closing control part 146 closes the entry/exit door 30 if an angle formed by (i) the side surface where the entry/exit door 30 is provided and (ii) the movement vector is outside a predetermined angular range centered around the entry/exit door 30.

Figure 6:
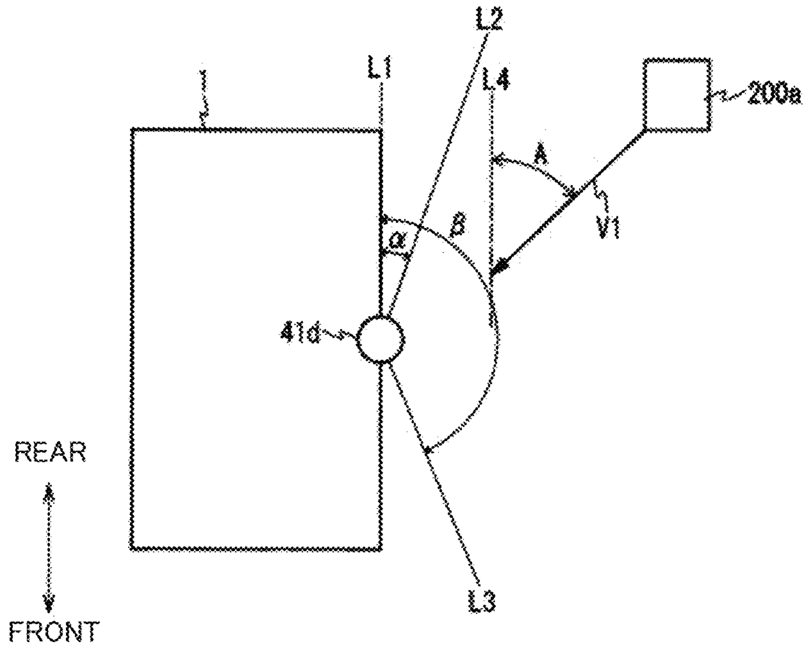
FIG. 6 is a schematic diagram for illustrating a relationship between a direction of a movement vector and a closing operation of an entry/exit door 30.

FIG. 6 is a schematic diagram for illustrating a relationship between the direction of the movement vector and the closing operation of the entry/exit door 30. In FIG. 6, a line L1 indicates a position of an opening and closing surface (the side surface of the autonomous bus 1) of the entry/exit door 30. A line L2 indicates a line forming an angle α with a line L0, a line L3 indicates a line forming an angle β with the line L1, and a line L4 indicates a line parallel to the line L1. The angle α is an angle in a range of 0° to 5°, and the angle β is an angle in a range of 1750 to 180°. The angle A is an angle formed by the line L4 and a movement vector V1 of the person 200*a*. If the angles A, α, and β do not satisfy the relationship of "α≤A≤β," the opening and closing control part 146 regards the person 200*a* as a person who will not get on the autonomous bus 1, and closes the entry/exit door 30. On the other hand, if the relationship of "α≤A≤β" is satisfied, the opening and closing control part 146 regards the person 200*a* as a person who will get on the bus, and opens the entry/exit door 30.

Processing Example of the Controller

A processing example of the controller 10 from when the autonomous bus 1 stops at the bus stop 100 to when the autonomous bus 1 departs will be described with reference to FIG. 7.

Figure 7:
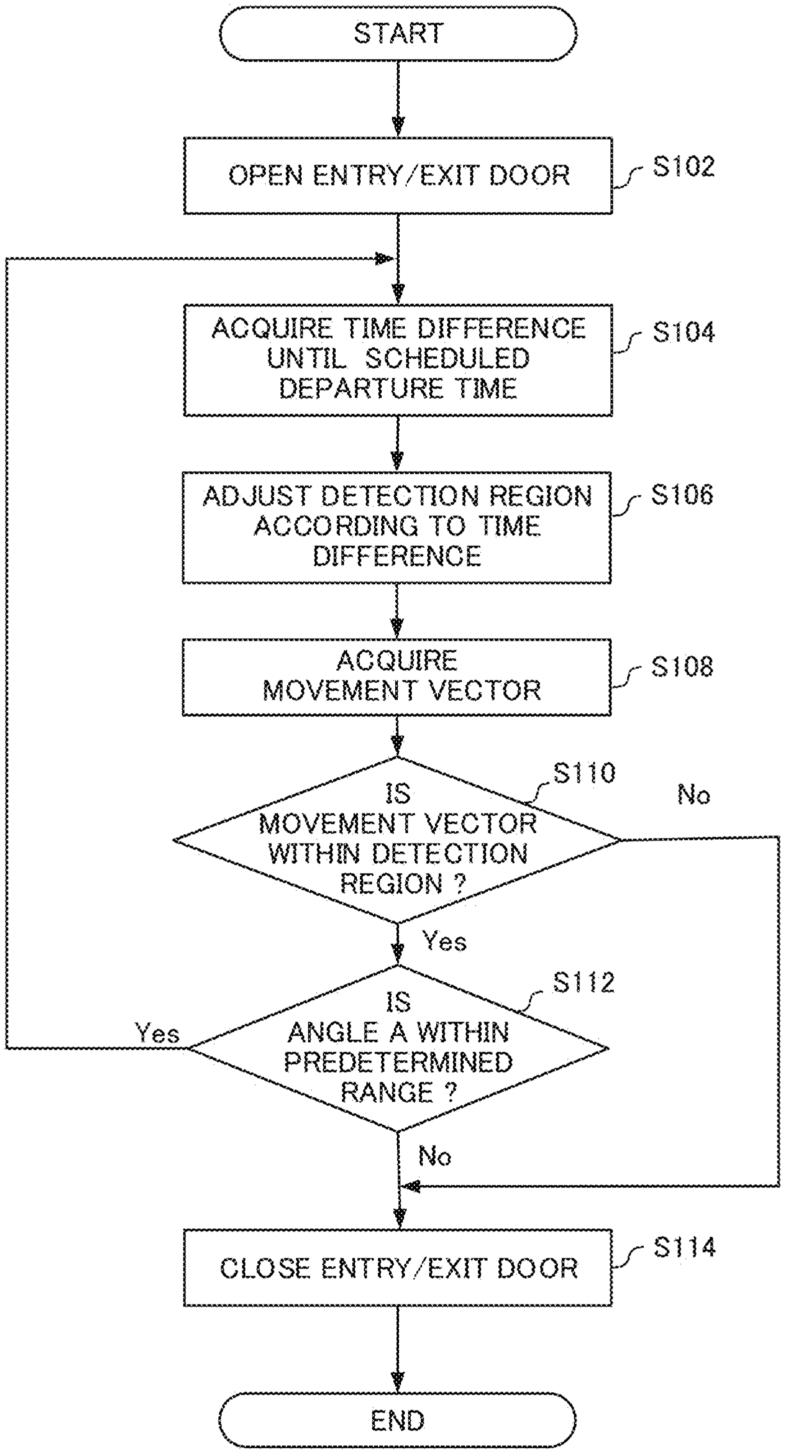
FIG. 7 is a flowchart for illustrating a processing example of the controller 10.

FIG. 7 is a flowchart for illustrating the processing example of the controller 10. The flowchart of FIG. 7 starts when the autonomous bus 1 stops at the bus stop 100 and the opening and closing control part 146 opens the entry/exit door 30 (step S102).

Next, the time difference acquisition part 143 acquires the time difference from the current time to the scheduled departure time of the autonomous bus 1 (step S104). For example, the time difference acquisition part 143 acquires the time difference by referencing the scheduled departure time included in the operation plan of the autonomous bus 1 stored in the storage 12.

Next, the region adjusting part 144 adjusts the detection region of the sensor 40 according to the time difference obtained in step S104 (step S106). For example, the region adjusting part 144 narrows the detection region when the scheduled departure time approaches.

Next, the people flow determination part 145 acquires a movement vector of a person located around the autonomous bus 1 (step S108). For example, the people flow determination part 145 obtains the movement vector indicating the movement direction and movement speed of the person on the basis of a result detected by the sensor 40 over a predetermined time.

Next, the opening and closing control part 146 determines whether or not the movement vector obtained in step S108 is located within the detection region adjusted in step S106 (step S110). Specifically, the opening and closing control part 146 determines whether at least a part of the movement vector is located within the detection region.

In a case where the movement vector is not located within the detection region in Step S110 (No), the opening and closing control part 146 closes the entry/exit door 30 (Step S114). On the other hand, when at least a part of the movement vector is located within the detection region in step S110 (Yes), the opening and closing control part 146 determines whether or not the angle A, which is formed by the movement vector and the opening and closing surface of the entry/exit door 30, is within a predetermined range (specifically, in the relationship of "α≤A≤β") (step S112).

If the angle A is not within the predetermined range in Step S112 (No), the opening and closing control part 146 closes the entry/exit door 30 (Step S114). On the other hand, if the angle A is within the predetermined range in step S112 (Yes), the process returns to step S104. After that, since the time difference until the scheduled departure time becomes shorter, the detection region is adjusted in accordance with the shortened time difference (that is, the detection region becomes narrower), and the people flow is determined again.

In a case where the current time has passed the scheduled departure time of the autonomous bus 1, the controller 10 determines the people flow while a detection region is fixed (for example, said detection region is fixed to the narrowest region within an adjustable range), and performs the closing operation of the entry/exit door 30.

Modified Example

Figure 8:
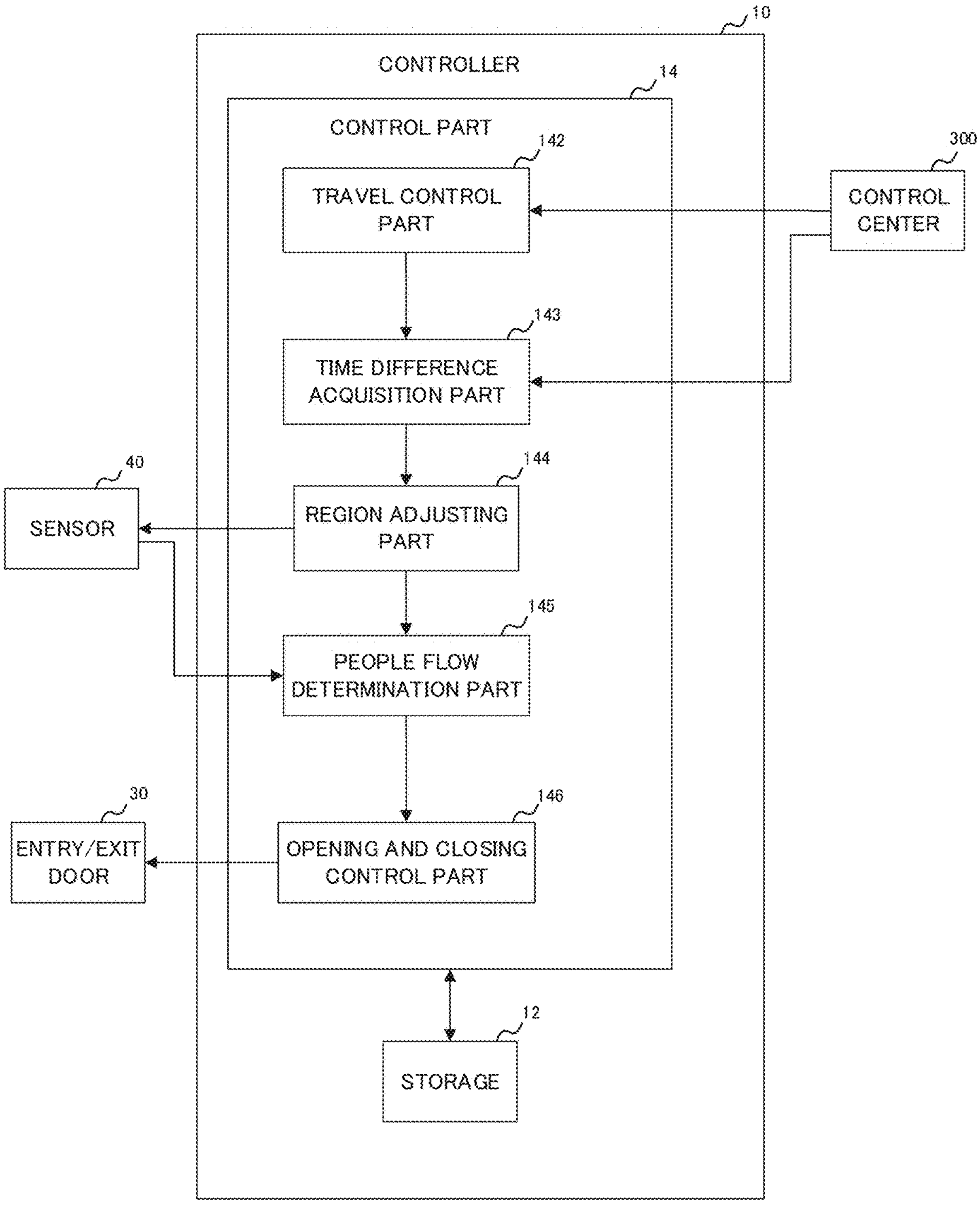
FIG. 8 is a schematic diagram for illustrating a Modified Example.

In the above description, the travel control part 142 and the time difference acquisition part 143 refer to the operation plan stored in the storage 12, but they are not limited thereto, and may refer to an operation plan transmitted from a control center 300 shown in FIG. 8, for example.

FIG. 8 is a schematic diagram for illustrating a Modified Example. Depending on the actual operation situation of the autonomous bus 1, the operation plan may be changed. Therefore, when the operation plan is changed, the controller 10 performs control by referencing the changed operation plan transmitted from the control center 300. Specifically, the travel control part 142 and the time difference acquisition part 143 determine a route to be travelled as well as scheduled dwell times and scheduled departure times at bus stops on the route by referencing the operation plan transmitted from the control center 300.

Effects of the Present Embodiment

The controller 10 according to the present embodiment described above adjusts the detection region of the sensor 40 depending on the time difference from the current time to the scheduled departure time when the autonomous bus 1 is stopped at the bus stop 100. Then, the controller 10 controls the closing operation of the entry/exit door 30 on the basis of the determination result of the people flow in the detection region after the adjustment. Accordingly, since it is possible to appropriately determine a person who is likely to get on the bus, by the scheduled departure time of the autonomous bus 1, it is possible to more appropriately perform the closing operation of the entry/exit door 30. As a result, the automatic opening and closing of the entry/exit door 30 can be performed more appropriately without using a complicated system.

The present disclosure is explained based on the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

DESCRIPTION OF SYMBOLS

1 Autonomous bus
30 Entry/exit door
40 Sensor
10 Controller
100 Bus stop
143 Time difference acquisition part
144 Region adjusting part
145 People flow determination part
146 Opening and closing control part

The invention claimed is:

1. A door opening and closing controller comprising:
a processor coupled to a memory storing instructions for the processor to function as:
a time difference acquisition part that acquires a time difference from a current time to a scheduled departure time at which a shared vehicle, which performs automatic traveling on the basis of a predetermined operation plan, departs from a shared vehicle stop, when the shared vehicle is stopped at the shared vehicle stop;
a region adjusting part that adjusts a detection region for detecting people around the shared vehicle with a sensor mounted on the shared vehicle before the scheduled departure time;
a people flow determination part that determines a people flow before the scheduled departure time in the adjusted detection region; and
an opening and closing control part that controls a closing operation of closing an entry/exit door of the shared vehicle on the basis of the people flow that has been determined, wherein
the region adjusting part narrows the detection region as the current time approaches the scheduled departure time.

2. The door opening and closing controller according to claim 1, wherein
the smaller the time difference, the more the region adjusting part narrows the detection region.

3. The door opening and closing controller according to claim 1, wherein
the region adjusting part adjusts detection regions of a plurality of the sensors, each detecting different directions, according to the time difference.

4. The door opening and closing controller according to claim 1, wherein
the people flow determination part identifies a movement vector of a person around the shared vehicle, and the opening and closing control part closes the entry/exit door when at least a part of the movement vector is not located within the detection region.

5. The door opening and closing controller according to claim 4, wherein the opening and closing control part closes the entry/exit door even if at least a part of the movement vector is located within the detection region, if an angle formed by a side surface of the shared vehicle where the entry/exit door is provided and the movement vector is outside a predetermined angle range centered around the entry/exit door.

6. The door opening and closing controller according to claim 1, wherein the people flow determination part excludes a person who passes by the entry/exit door along a front-rear direction of the shared vehicle from the determination for controlling the closing operation.

7. The door opening and closing controller according to claim 1, wherein the opening and closing control part closes the entry/exit door at a timing when it is determined, by the people flow determination part, that no people flow reaches the entry/exit door by the scheduled departure time.

* * * * *